(No Model.)
H. O. HEM.
PRUNING KNIFE.
No. 535,758. Patented Mar. 12, 1895.
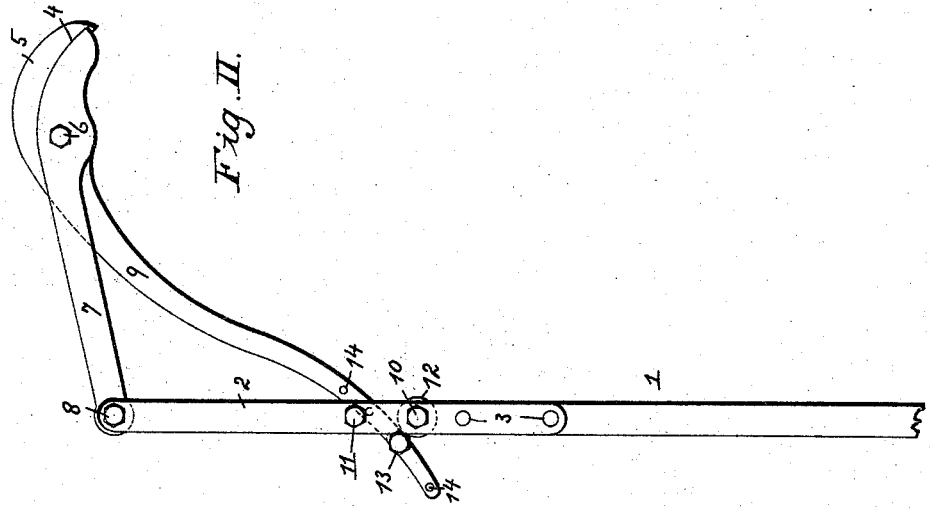
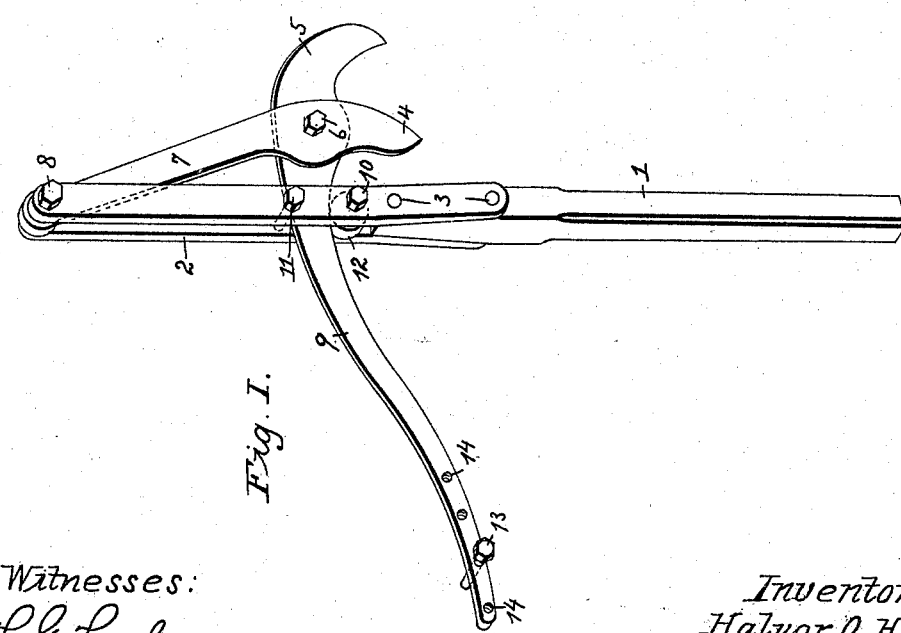
Witnesses:
F. G. Fischer
R. L. Silverman
Inventor:
Halvor O. Hem
By Knight Bros.
Attys.

UNITED STATES PATENT OFFICE.

HALVOR O. HEM, OF KANSAS CITY, KANSAS.

PRUNING-KNIFE.

SPECIFICATION forming part of Letters Patent No. 535,758, dated March 12, 1895.

Application filed December 5, 1893. Serial No. 492,872. (No model.)

*To all whom it may concern:*

Be it known that I, HALVOR O. HEM, a citizen of the United States, residing at Kansas City, in the county of Wyandotte, State of Kansas, have invented certain new and useful Improvements in Pruning-Knives, of which the following is a full, clear, and exact description, reference being had to the accompanying drawings, which are made part of this specification.

My invention relates to improvements in pruning knives, and my invention consists in certain features of novelty, which are hereinafter fully described and set forth in the claims.

Figure I, shows a perspective view of my improved pruning knife. Fig. II, shows same with blades closed.

1, is a staff or handle. 2 is a frame connected therewith by the pins or bolts 3, forming part thereof.

4 and 5 are cutting blades pivoted together at 6.

7, is an arm carrying the cutting blade 4, and pivoted to the frame at 8.

9, is an arm carrying the cutting blade 5.

10, and 11, are bolts determining the vertical motion of the arm 9. On the bolt 10 is carried the frictional roller 12, to relieve the friction of the sliding arm 9.

13 is a pin set in the outer end of the arm 9 to determine the movement of the handle thereon, and is abjustable by the holes 14, to compensate the wearing away of the cutting blades in sharpening.

In the operation of my improved pruning knife, the blade 5, is engaged with the limb to be cut off, and the handle is drawn down, drawing with it the arm 7, to the position shown in Fig. II; the curve of the sliding arm 9, giving increased leverage during the operation. The principal advantage I claim over other pruning knives being that the force of the cutting blades near the end of the cut is greater than at any other point by reason of the increased leverage before mentioned.

I do not, however, confine myself to the construction shown in the drawings, as the pivoted arm 7 may be below the sliding arm on the handle, and the operation performed by pushing up on the handle instead of pulling down, or the arm 9 may be constructed to slide upon the handle in other positions than that shown.

What I claim as my invention, and desire to secure by Letters Patent, is—

1. In a pruning-knife the combination of a handle, a pair of cutting blades pivoted together, an arm pivoted to the handle and carrying one of the cutting blades, a detached arm carrying the other cutting blade, and a bearing on the handle in which said detached arm slides transversely to the handle and longitudinally of said arm; substantially as shown and described and for the purpose set forth.

2. A pruning knife comprising a suitable handle, a pair of blades pivoted together, an arm connected with one blade and pivotally connected with the end of the handle, an elongated detached arm connected with the other blade, and the bolts on the handle between which the detached arm slides longitudinally of its length and transversely to the handle and by which it is confined against movement longitudinally of the handle, substantially as and for the purpose set forth.

HALVOR O. HEM.

Witnesses:
R. L. SILVERMAN.
JAMES F. MISTER.